United States Patent [19]
Sakai

[11] Patent Number: 5,200,120
[45] Date of Patent: Apr. 6, 1993

[54] METHOD OF FORMING OPTICAL DISCS

[75] Inventor: Naomi Sakai, Chiba, Japan

[73] Assignee: Japan Synthetic Rubber Co., Ltd., Tokyo, Japan

[21] Appl. No.: 554,849

[22] Filed: Jul. 20, 1990

[30] Foreign Application Priority Data

Jul. 21, 1989 [JP] Japan ................................. 1-190396

[51] Int. Cl.$^5$ ............................................. B29D 11/00
[52] U.S. Cl. ..................................... 264/1.3; 264/1.4; 264/22; 264/107; 427/164
[58] Field of Search ................ 369/272, 283, 284, 286, 369/275.1, 275.3, 275.4; 264/1.3, 1.4, 106, 107, 22; 156/231, 273.3; 427/164

[56] References Cited

U.S. PATENT DOCUMENTS

| | | | |
|---|---|---|---|
| 4,374,077 | 2/1983 | Kerfeld | 264/106 |
| 4,790,893 | 12/1988 | Watkins | 264/1.3 |
| 4,956,214 | 9/1990 | Imataki et al. | 264/1.3 |

FOREIGN PATENT DOCUMENTS

| | | | |
|---|---|---|---|
| 118143 | 9/1984 | European Pat. Off. | 264/1.3 |
| 158046 | 9/1982 | Japan | 264/107 |
| 45636 | 3/1983 | Japan | 264/107 |
| 14341 | 1/1988 | Japan | 264/1.4 |

Primary Examiner—James Lowe
Attorney, Agent, or Firm—Oblon, Spivak, McClelland, Maier & Neustadt

[57] ABSTRACT

The optical disc of the present invention has a transparent substrate provided on the surface opposite to the surface of a metallic reflective film in contact with a recording layer, and reading of predetermined information is performed by permitting a laser beam to be incident from the transparent substrate side. That is, light is reflected on the surface on the opposite side to the surface of the metallic reflective film in contact with the recording layer, and by employment of such a mechanism, it becomes possible to enhance the reflectance in the metallic reflective film, and also the difference in surface reflectance between the concavity and the convexity is effectively corrected at the uneven pit portion with memorized information.

1 Claim, 2 Drawing Sheets form a laminated product curing the layer of said resin by irradiating the laminated product with a radiation from the support sheet side to thereby transfer the uneven pits from the stamper to the resin layer thus cured, subsequently forming a metallic reflective film on the surface of said uneven pit surface of the cured resin, and laminating a transparent substrate through a transparent adhesive layer on said metallic reflective film, and cutting the laminated product into a disc shape.

METHOD OF FORMING OPTICAL DISCS

BACKGROUND OF THE INVENTION

1. Field of the Invention

This invention relates to an optical disc as represented by compact discs (CD), laser video discs (LVD), particularly to an optical disc by the Photo-Polymer method (2P method), a process for producing the same and a reading method.

2. Description of the prior art

As a representative method for preparation of an optical disc, there has been known the Photo-Polymer method which duplicates a disc by use of a polymer which is cured by UV-ray irradiation (UV-ray curable resin).

More specifically, this method comprises filling or coating a UV-ray curable resin between a stamper (mold) having uneven pits with a predetermined memorized information and a transparent substrate which becomes the disc base, curing said resin by irradiation with a UV-ray, then peeling off the stamper to form a recording layer having uneven pits on the transparent substrate, forming a metallic reflective film on the uneven pit surface by such means as vapor deposition or sputtering of a metal, and further forming a protective film, thereby forming an optical disc.

The optical disc is adapted to reproduce the information memorized by permitting an optical signal such as laser beam, etc. to enter from the transparent substrate side and reading the reflected light signal from the metallic reflective film.

The optical disc prepared as described above permits a light such as a laser beam, etc. to enter from the transparent substrate side, pass through the recording layer and reach the reflective film. In this case, however, the reflectance of the laser beam is not sufficiently high, and moreover, there is a problem that the surface reflectance at the concavity in the uneven pits formed by the metallic reflective film is considerably different from that at the convexity.

Thus, since in an optical disc, lightness and darkness due to phase difference between the reflected lights from the above-mentioned concavity and convexity is grasped as the signal to perform reproduction of the memorized information, such remarkable difference in reflectance between the concavity and the convexity will lead to many bit errors so as to bring about a very undesirable deterioration in quality of the information reproduced (e.g., sound or image).

SUMMARY OF THE INVENTION

An object of the present invention is to provide an optical disc in which the reflectance at the concavity of the metallic reflective film formed on the uneven pit surface with a predetermined memorized information is extremely close to the reflectance at the convexity, a process for producing the same, and a reading method.

According to the present invention, there is provided an optical disc comprising a recording layer having uneven pits with predetermined memorized information, a metallic reflective film formed on said uneven pit surface, and a transparent substrate laminated through a transparent adhesive layer on said reflective film.

Also, according to the present invention, there is provided a process for producing an optical disc, which comprises coating a radiation curable resin composition on a support sheet, pressure contacting the layer of said radiation curable resin composition with a stamper having uneven pits with a predetermined memorized information to form a laminated product curing the layer of said resin by irradiating the laminated product with a radiation from the support sheet side to thereby transfer the uneven pits from the stamper to the resin layer thus cured, subsequently forming a metallic reflective film on the surface of said uneven pit surface of the cured resin, and laminating a transparent substrate through a transparent adhesive layer on said metallic reflective film, and cutting the laminated product into a disc shape.

Further, according to the present invention, there is provided a method of reading a record from an optical disc, wherein said optical disc comprises a recording layer having uneven pits with predetermined memorized information, a metallic reflective film formed on said pit surface and a transparent substrate laminated through a transparent adhesive layer on said reflective film, said method comprising the step of permitting a laser beam to be incident onto the optical disc from the side of said transparent substrate.

The optical disc of the present invention as described above has a salient feature in that the reverse surface of the surface of the metal reflective film in contact with the recording layer is used as the laser beam reflection surface. By this feature, the reflectance can be made higher, and also at the uneven pit portion with a memorized information, the difference in surface reflectance between the concavity and the convexity can be effectively decreased to reduce markedly bit error of the optical disc; thereby the quality of the information reproduced such as sound, image, etc. is improved.

Further, according to the present invention, there is provided a process for forming uneven pits, which comprises:

coating a radiation curable resin composition on a transparent substrate or a support sheet, also coating a radiation curable resin composition on a stamper having uneven pits with a predetermined memorized information, pressure contacting said transparent substrate or support sheet with the stamper at a positional relationship so that said radiation curable resin composition may be contacted face with face to each other to form a laminated product, irradiating said laminated product with radiation from the side of the transparent substrate or support sheet to effect curing of said radiation curable resin composition, thereby transferring the uneven pits from the stamper to the resin thus cured, and subsequently peeling off the stamper, followed by forming a metallic reflective film on the uneven pit surface of the cured resin.

The method of forming uneven pits has the salient feature in that both of the transparent substrate or support sheet on which the uneven pit surface is to be formed and the stamper having the uneven pits with a predetermined memorized information are coated with a radiation curable resin composition. By applying such a method to production of the optical disc as described above or to production of an optical disc known in the art, incorporation of bubbles or staining of the stamper caused thereby can be effectively prevented during formation of uneven pits by pressure contact with the above-mentioned stamper, and productivity can be improved markedly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE INVENTION PREFERRED EMBODIMENT

Optical disc

Figure 1:
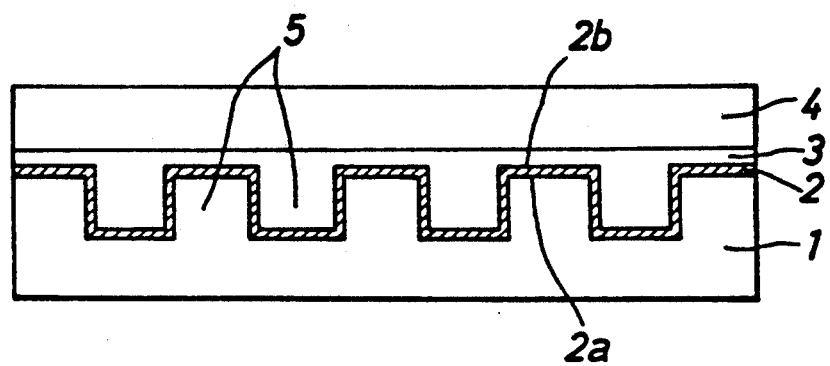
FIG. 1 illustrates the sectional structure of the optical disc of the present invention.

An example of the optical disc of the present invention is described by use of the drawings. In FIG. 1, which shows the sectional structure, the optical disc comprises a recording layer 1, a metallic reflective film 2, an adhesive layer 3 and a transparent substrate 4.

As is apparent from FIG. 1, on the recording layer 1 are formed uneven pits 5 with predetermined memorized information, and the metallic reflective film 2 is formed on the uneven pits 5. The adhesive layer 3 is made transparent.

In the optical disc of the present invention, a laser beam is permitted to enter from the transparent substrate 4 side, and the reflected light from the metallic reflective film 2 with an uneven shape corresponding to the uneven pits 5 is read so as to reproduce the information.

The important feature in the present invention resides in that the transparent substrate 4 is provided on the side of the surface 2b of the metallic reflective film 2 (hereinafter called the "formation initiation surface") opposite to the surface 2a which is in contact with the recording layer.

Thus, in the optical disc of the present invention, light is reflected at the surface 2b on the opposite side to the formation initiation surface 2a of the metallic reflective film 2.

In the present invention, the recording layer 1 is generally formed of a cured product of a radiation curable resin composition.

Examples of such radiation curable resin compositions may include the compositions described in Japanese Unexamined Patent Publication (KOKAI) No. 36615/1989, such as those comprising oligomers of epoxy (meth)acrylate or urethanne (meth)acrylate to which monomers such as glycidyl (meth)acrylate, trimethylpropane tri(meth)acrylate, acrylic acid, or the like and photopolymerization initiators are added.

The viscosity of the radiation curable resin composition is preferably in a range of from 30 to 300 cP at 25° C., which viscosity makes it possible to further reduce the incorporation of bubbles.

The recording layer 1 is not positioned on the optical path side, and therefore may be also colored by addition of a colorant, etc.

The thickness of the recording layer 1 may be generally 5 to 50 μm. The metallic reflective film 2 is formed of, for example, aluminum, aluminum-titanium alloy, titanium-copper alloy, silver-titanium alloy, etc., and said film should preferably have a thickness generally of 500 to 1500 Å, particularly 700 Å to 1000 Å. If the thickness is less than 500 Å, no surface smoothing effect by the thickness of the metallic reflective film 2 can be realized, resulting in that it is difficult to remove the difference in reflectance between the concavity and the convexity, and also the reflectance of the metallic reflective film 2 is liable to be lowered.

On the other hand, if the thickness of the metallic reflective film 2 exceeds 1500 Å, the shape of the uneven pits with predetermined memorized information can be effectively reproduced only with difficulty.

The depth of the uneven pits formed by the metallic reflective film 2 is ¼ of the wavelength of the light such as a laser beam as conventionally employed.

The transparent adhesive layer 3 formed on the metallic reflective film 2 as described above may be formed of any adhesive, provided that transparency can be retained, but is formed of a radiation curable resin composition when the optical disc of the present invention is prepared according to the preparation method as described below. Such radiation curable resin composition includes, for example, radiation curable resin compositions to be used for formation of the above-described recording layer 1.

Since the transparent adhesive layer 3 is positioned on the optical path side during information reproduction, it is required to be provided uniformly so as not to fluctuate the optical path length, and its thickness should be desirably within the range from 5 to 50 μm. If the thickness is less than 5 μm, pinholes are liable to be formed, while if it exceeds 50 μm, the thickness can be made uniform only with difficulty.

Further, the transparent substrate 4 laminated through the above-described adhesive layer 3 comprises a light transmissive plastic substrate such as polycarbonate resin, acrylic resin, vinyl cholride resin, etc. or a glass substrate, and is generally made to have a thickness of about 1 to 1.5 mm.

The recording layer of the optical disc of the present invention as described above can be prepared according to the methods known in the art such as the injection molding method, the Photo-Polymer method, the heat transfer method, etc. Among them, the Photo-Polymer method is preferred in view of high transfer ratio of information.

Preparation of optical disc

In the following, the preparation method of the optical disc according to the Photo-Polymer method is described by referring to FIGS. 2(A), 2(B) and 2(C) which show the preparation steps.

Figure 2:
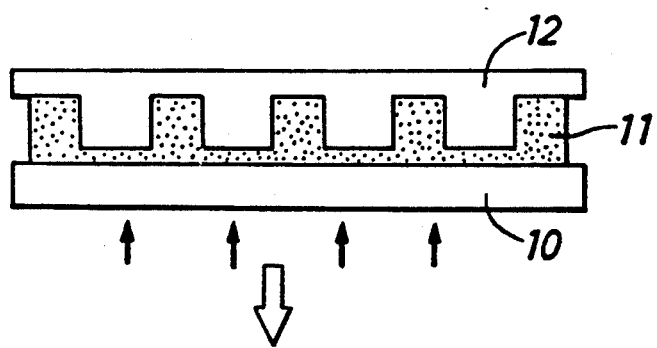
FIGS. 2(A), 2(B), and 2(C) illustrate the preparation steps of the optical disc of the present invention.
Figure 2:
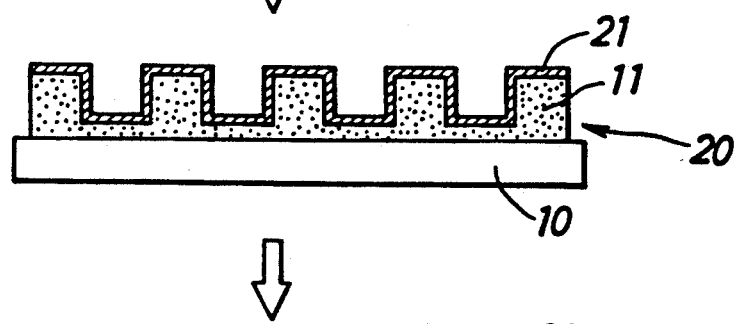
Figure 2:
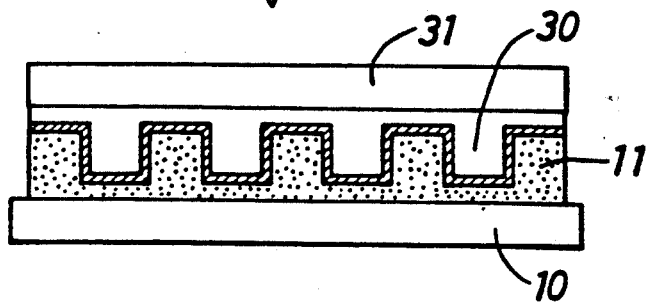

First, the support sheet 10 is coated with the above-mentioned radiation curable resin composition 11, and on the coated surface is pressure contacted the stamper 12 having the uneven pits with predetermined memorized information, and the resin is cured by irradiation with a radiation, for example, a UV-ray from the support sheet 10 side (FIG. 2(A)).

Here, the support sheet 10 is required to be transparent by necessity for effecting curing of the radiation curable resin composition coated thereon, and may be, for example, a transparent resin sheet of polycarbonate resin, acrylic resin, etc. with a thickness of about 25 to 100 μm, particularly preferably formed of the same material as the above-described transparent substrate.

Curing of the radiation curable resin composition practiced by UV-ray irradiation is completed generally within several seconds and, after completion of curing, the support sheet 10 and the cured resin composition 11 are peeled off from the stamper 12 to produce the recording layer. Formation of the uneven pits in Step A is described in detail later.

Subsequently, the metallic reflective film 21 as described above is formed on the uneven surface of the recording layer (shown as a whole by 20) (FIG. 2(B)).

The metallic reflective film is generally formed by vapor deposition or sputtering. Vapor deposition or sputtering may be performed under the conditions generally employed in the prior art.

On the surfaces of the metallic reflective film 21 thus obtained is uniformly coated a radiation curable resin composition 30 for formation of a transparent adhesive layer, and the transparent substrate 31 separately prepared is pressure contacted and laminated thereon by means of rollers, etc.

Radiation, for example, UV-ray is irradiated from the above-mentioned transparent substrate 31 side under this state to cure the above-mentioned radiation curable resin composition 30, thereby forming a transparent adhesive layer (FIG. 2(C)).

For the radiation curable resin composition 30 to be used in this step, the same kind as that employed in the above step shown in FIG. 2(A) can be used. For the transparent adhesive layer which is positioned on the optical path side during information reproduction, particularly one with high transparency is employed, and no colorant, etc. will not be added thereto.

After formation of the transparent adhesive layer, the above-mentioned support sheet 10 is peeled off, if necessary, punched into a disc shape, and an optical disc for one surface reading is thereby obtained. Reading of the optical disc can be performed by permitting a laser beam, etc. to enter from the transparent plate 31 side.

In this case, the support sheet peeled off may be, provided for reutilization if desired.

It is also possible to form an optical disc for reading of both surfaces by laminating the optical discs for one surface reading to each other at the positional relationship so that the recording layers 11 may face each other.

Formation of uneven pits

Preferably, in the optical disc as described above, for formation of the uneven pits 5 in the step shown in FIG. 2(A), the radiation curable resin composition 11 is coated on the support sheet 10, the same composition 11 is also coated on said uneven pit surface of the stamper 12 having the uneven pits with predetermined memorized information, separately, and then pressure contact between the support sheet 10 and the stamper 12 are carried out.

Figure 3:
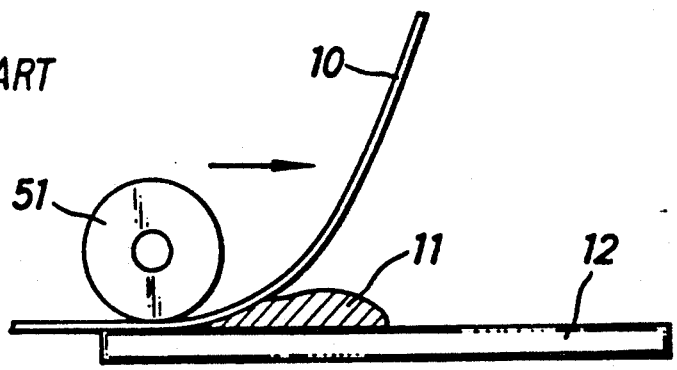
FIG. 3 illustrates the method of forming uneven pits of the prior art.

If pressure contact is done between the support sheet 10 and the stamper 12 with the radiation curable resin composition 11 being coated only on the support sheet 10, bubbles are liable to be incorporated into the composition 11, whereby defective curing of the radiation curable resin composition occurs, resulting consequently in disadvantages such as staining of the stamper 12, which requires washing operation and markedly lowers productivity. For prevention of such bubbles, one may consider a method as shown in FIG. 3, which comprises positioning a pressure contact roller 51 on the upper side of the stamper 12, passing the support sheet 10 between the two, casting the radiation curable resin composition 11 onto the stamper 12 while flexing upwardly the end of said support sheet 10 and forwarding the pressure roller 51, thereby effecting pressure contact from the end of the stamper 12.

According to such method, bubbles incorporated into the radiation curable resin composition 11 are discharged from the open side on the composition 11 depending on the difference between the pressure due to the pressure contact and the outer atmospheric pressure.

However, according to the method of the prior art as described above, even though the bubbles may be effectively discharged when the progress speed of the pressure contact roller 51 is low, if the progress speed of the pressure contact roller 51 is high (e.g. 3 m/min. or higher), during pressure contact operation, the bubbles are incorporated by turn-round of the radiation curable resin composition 11, etc. and attached onto the support sheet 10 or stamper 12; hence the bubbles can be discharged with difficulty, whereby defective curing of the radiation curable resin composition 11 is liable to occur.

In contrast, by coating both the support sheet 10 and the stamper 12 with the radiation curable resin composition 11 according to the present invention, even if bubbles may be incorporated by turn-round of the radiation curable resin composition during pressure contact operation, since the bubbles are under the state apart from the support sheet of the stamper, attachment of the bubbles onto the support sheet or the stamper can be effectively prevented and the bubbles incorporated can be effectively discharged.

For example, as is apparent from the Examples as described below, where the radiation curable resin composition is coated only on the support sheet, staining of the stamper occurs when the progress speed of the pressure contact roller becomes 2.4 m/min., while where the radiation curable resin composition is coated on both of the support sheet and the stamper, no staining of the stamper occurs, even if the progress speed of the pressure contact roller becomes 7.2 m/min.

Thus, it will be understood that the optical disc of the present invention can be produced at high productivity by employment of the method of forming uneven pits.

Figure 4:
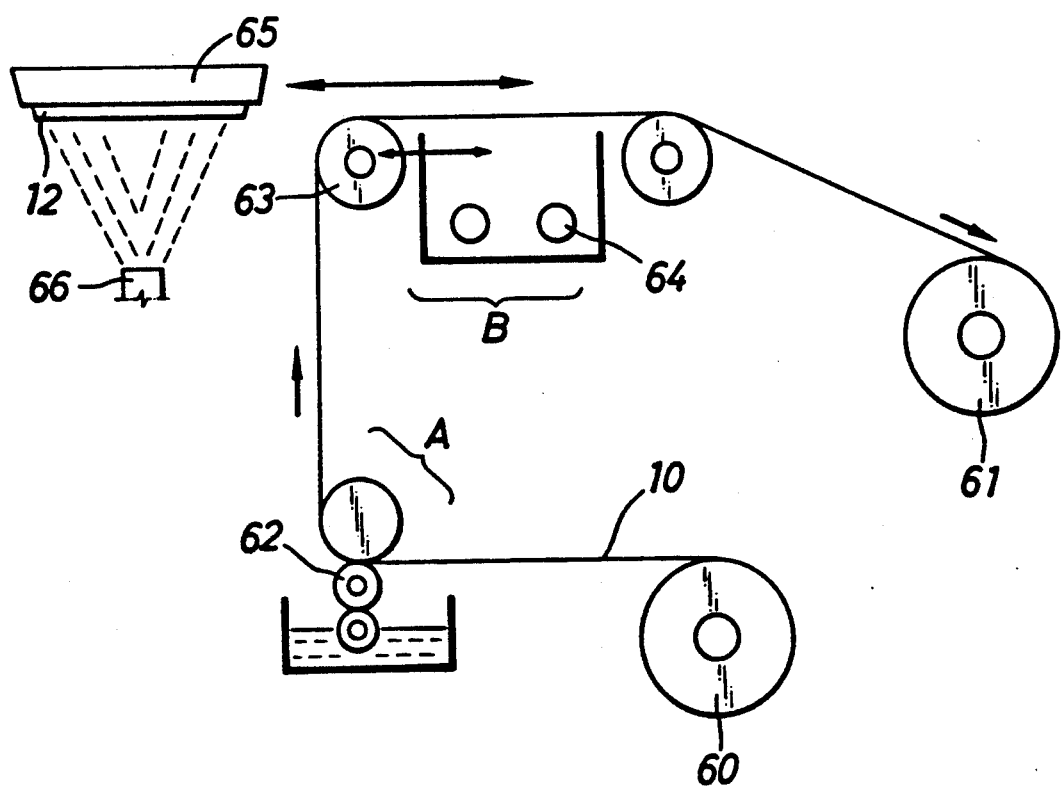
FIG. 4 illustrates an example of the equipment for practicing suitably the method of forming the uneven pits of the present invention.

FIG. 4 shows an example of equipments for practicing preferably the method of forming uneven pits.

In FIG. 4, the support sheet 10 is adapted to pass from the film supply roller 60 through the coating region A and the transfer region B, until finally taken up by the take-up roller 61.

In the coating region A is provided a coating head 62, by which the radiation curable resin composition is coated on one surface of the support sheet 10.

In the transfer region B is provided a pressure contact roller 63, and also a UV-ray irradiation lamp 64 is arranged, so that UV-ray may be irradiated from the lower side of the support sheet 10.

Further, in the vicinity of the transfer region B, a stamper 12 having uneven pits with a predetermined memorized information is supported on a holder 65. The stamper 12 is adapted to be movable in reciprocal fashion to and from the transfer region B.

Below the stamper 12 is arranged a spray head 66 so that the same radiation curable resin composition as that coated on the support sheet 10 may be coated on the uneven pit surface of the stamper 12.

Thus, the stamper 12 coated on its uneven pit surface with the radiation curable resin composition is introduced into the transfer region B, where pressure contact operation is done by the pressure contact roller 63. The pressure contact strength of the pressure contact roller 63, which depends on the viscosity of the radiation curable resin composition to be employed, may be, for example, in the case of 700 cP (25° C.), about 180 to 220 g per 1 cm width.

Under this state, UV-ray is irradiated by the UV-ray irradiation lamp 64 from the lower side of the support sheet 10 to cure the radiation curable resin composition. Curing of the radiation curable resin composition effected by UV-ray irradiation is generally completed within several seconds. After completion of curing, the stamper 12 returns to the initial position, and also during this operation, the cured radiation curable resin composition is peeled off from the stamper 12 integrally with the support sheet 10, whereby the uneven pit surface with a predetermined memorized information is transferred onto the support sheet 10.

Subsequently, the support sheet 10 with the uneven pit surface transferred thereon is delivered by one transfer unit, and again the above-described steps will be repeated.

In the method of forming uneven pits of the present invention described above, the layer of the radiation curable resin composition coated on the support sheet 10 may be generally preferred to have a thickness of 10 to 50 μm, and the layer of the radiation curable resin composition coated on the uneven pit surface of the stamper 12 should be generally preferred to have a thickness of 1 to 10 μm.

The delivery speed of the pressure contact roller may be generally 0.5 to 6 m/min., preferably 2.5 to 3 m/min.

By applying the step shown in FIG. 2(B) and FIG. 2(C) as described above to the uneven pits thus formed, the optical disc of the present invention can be produced with high productivity.

The method of forming uneven pits described above can be applied no only to the optical disc of the present invention but also effectively to the production of optical discs known in the art in which the information memorized is reproduced by the reflected light at the metallic reflective film surface in the side of the above formation initiation surface. In this case, in place of the support sheet 10, a transparent substrate may be employed. As such a transparent substrate, a light-transmissive plastic plate made of polycarbonate resin, acrylic resin, vinyl chloride resin, etc. with a thickness generally of 1 to 1.5 mm, preferably of about 1.2 mm, may be employed, or in some cases, a glass plate can be also employed. The uneven pits formed by use of such transparent substrate may be subjected to vapor deposition or sputtering of a metal according to the method known per se in order to have a metallic reflective film formed thereon, followed further by formation of an appropriate protective film, which is then cut into a disc form to provide an optical disc known in the art.

EXAMPLES

The excellent effects of the present invention are described by referring to the following Examples.

EXAMPLE 1

On a polycarbonate with a thickness of 100 μm was roller coated a radiation curable resin composition having the following composition to a thickness of 50 μm.

On the composition was pressure contacted a stamper having positive signals, followed by curing of the above resin composition by irradiation with UV-rays for 0.5 second.

| | |
|---|---|
| Epoxy acrylate (Mitsubishiyuka Fine, EA-1370) | 40 pbw* |
| Trimethylolpropane triacrylate | 12 pbw |
| Tricyclodecanediyl dimethylene diacrylate | 20.9 pbw |
| Silicone acrylate oligomer | 0.3 pbw |
| Isobornyl acrylate | 9 pbw |
| Acrylic acid | 13 pbw |
| 1-Hydroxycyclohexyl phenyl ketone | 2.5 pbw |
| Benzylphenone | 1.2 pbw |
| 4-Dimethylaminobenzoic acid | 1.2 pbw |

*pbw: parts by weight

After completion of curing, the recording layer obtained was peeled off from the stamper, and aluminum was sputtered on its uneven surface side by means of a sputtering device "SPF-430H" (Magnetron system, Nichiden Anerba) to form a metallic reflective film of 1000 Å.

Subsequently on the metallic reflective film surface was coated a radiation curable resin composition with the same composition as mentioned above to a thickness of 50 μm after curing, and the coating was pressurized onto a polycarbonate substrate with a 1 mm thickness, followed by curing of the radiation curable resin composition similarly as described above to form a transparent adhesive layer and punching into a disc shape to prepare an optical disc having the same constitution as shown in FIG. 1.

For the optical disc, reflectance was measured by permitting a light of 780 nm wavelength to enter from the formation initiation side of the metallic reflective film and the opposite side thereto, respectively, to obtain the results as shown in Table 1.

TABLE 1

| | Concavity of stamper | Convexity of stamper |
|---|---|---|
| Vapor deposition surface | 79% | 73% |
| Opposite side surface | 85% | 83% |

When the information was reproduced by irradiation of a laser beam from the opposite side to the formation initiation surface of the metallic reflective film by use of the optical disc, the error at the outer peripheral portion was found to be slight.

EXAMPLES 2 AND 3

An optical disc was prepared in the same manner as in Example 1 except for forming the metallic reflective film of a titanium-aluminum alloy (Example 2) or titaniumcopper alloy (Example 3).

For the optical disc, reflectance was measured by permitting a light of 780 nm wavelength to enter from the formation initiation side of the metallic reflective film and the opposite side thereto, respectively, to obtain the results shown in Table 2.

TABLE 2

| | | Concavity of stamper | Convexity of stamper |
|---|---|---|---|
| Example 2 | Vapor deposition surface | 72% | 65% |
| | Opposite side surface | 80% | 78% |
| Example 3 | Vapor deposition surface | 64% | 56% |

TABLE 2-continued

|  | Concavity of stamper | Convexity of stamper |
|---|---|---|
| Opposite side surface | 74% | 72% |

When the information was reproduced by irradiation of a laser beam from the opposite side to the formation initiation surface of the metallic reflective film by use of these optical discs, the error at the peripheral portion became about half as compared with conventional optical discs in which reproduction of information is effected by irradiation of laser beam from the formation initiation surface side.

EXAMPLE 4

By means of the equipment shown in FIG. 4, on a polycarbonate film with a thickness of 100 μm was coated a radiation curable resin composition with a viscosity of 700 cP to a thickness of about 30 μm.

On the other hand, a stamper was spray coated with the same radiation curable resin composition as above to a thickness of about 5 to 10 μm. The spray coating was performed by an airless spray in order to make scattering of splashes minimum.

Pressure contact between the stamper and the polycarbonate film substrate was effected by varying the speed of pressure contact rollers, and also the above region was cured by irradiation with UV-rays for 0.5 second to transfer the uneven pits with a predetermined memorized information.

For the various films obtained, generation of bubbles and the state of staining of the stamper were evaluated to obtain the results shown in Table 3.

For comparison, the same evaluations were performed for those on which uneven pits were transferred without coating of the radiation curable resin composition at all on the stamper, and the evaluation results obtained are also shown in Table 3.

The radiation curable resin composition used had the composition as shown below.

| Epoxy acrylate (Mitsubishiyuka Fine, EA-1370) | 40 pbw* |
|---|---|
| Trimethylolpropane triacrylate | 12 pbw |
| Tricyclodecanediyl dimethylene diacrylate | 20.9 pbw |
| Silicone acrylate oligomer | 0.3 pbw |
| Isobornyl acrylate | 9 pbw |
| Acrylic acid | 13 pbw |
| 1-Hydroxycyclohexyl phenyl ketone | 2.5 pbw |
| Benzylphenone | 1.2 pbw |
| 4-Dimethylaminobenzoic acid | 1.2 pbw |

*pbw: parts by weight

Evaluations of bubbles and staining were performed by measuring $C_1$ errors by a CD error measuring instrument, and classified as follows.

TABLE 3

| Roller speed (m/min) | Substrate coat | | Substrate coat + Stamper coat | |
|---|---|---|---|---|
| | Bubble | Staining | Bubble | Staining |
| 0.8 | A | A | A | A |
| 1.2 | A | A | A | A |
| 2.4 | B | C | A | A |
| 4.8 | C | C | B | A |
| 7.2 | C | C | B | A |

A: bit error rate 0-20
B: bit error rate 20-200
C: bit error rate 200 or more.

We claim:

1. A process for forming uneven pits which comprises:
   coating a radiation curable resin composition on one of a transparent substrate and a support sheet,
   coating a radiation curable resin composition on a stamper having uneven pits with predetermined memorized information,
   pressure contacting said one of said transparent substrate and said support sheet with the stamper at a positional relationship so that said radiation curable resins may be contacted face to face to each other to form a laminated product,
   irradiating the laminated product with radiation from the side of said one of said transparent substrate and said support sheet to effect curing of said radiation curable resin composition, thereby transferring the uneven pits from the stamper to the resin thus cured, and
   subsequently peeling off the stamper, followed by forming a metallic reflective film on the uneven pit surface of the cured resin.

* * * * *